United States Patent [19]

Giles

[11] 4,024,645
[45] May 24, 1977

[54] METHOD AND APPARATUS FOR MEASURING LENGTH

[75] Inventor: Donald Beresford Giles, Angmering, England

[73] Assignee: K. D. G. Instruments Limited, Bath, England

[22] Filed: Aug. 1, 1975

[21] Appl. No.: 601,204

[30] Foreign Application Priority Data

Aug. 14, 1974 United Kingdom ............. 35868/74

[52] U.S. Cl. .............................. 33/129; 33/172 F; 242/36

[51] Int. Cl.² ........................................ G01B 19/04

[58] Field of Search .................. 33/132, 129, 172 F, 33/127, 128, 136; 242/36, 39

[56] References Cited

UNITED STATES PATENTS 3,087,248 4/1963 Martin .............................. 33/132 X

FOREIGN PATENTS OR APPLICATIONS

| 1,231,020 | 12/1966 | Germany | 33/172 F |
| 1,169,345 | 4/1964 | Germany | 33/129 |
| 1,195,056 | 6/1965 | Germany | 33/129 |
| 1,204,416 | 11/1965 | Germany | 33/132 |

Primary Examiner—William D. Martin, Jr.
Attorney, Agent, or Firm—Cushman, Darby & Cushman

[57] ABSTRACT

The invention provides an apparatus and method for continuously measuring the length of linear material during winding of the material onto a rotating core to form a package. First means form an electrical signal whose frequency is proportional to the instantaneous diameter of the package being wound. Second means form at least one pulse of fixed length for each revolution of the package. A gating means allows the variable frequency signal to reach an output line only during the period of each said fixed length pulse and a counter algebraically counts at least a proportion of the individual cycles of said signal reaching said output line.

17 Claims, 3 Drawing Figures

METHOD AND APPARATUS FOR MEASURING LENGTH

The present invention relates to a method and apparatus for measuring lengths of a linear material as it is being wound onto a core on a rotating spindle such as a reel, tube or cone. The linear material may be unidimensional such as thread, string, cord, wire, or it may be two dimensional, such as a fabric or paper web. In particular, the invention is concerned with measuring the length of textile material thread as it is being wound to form a cylindrical or conical package.

Linear materials are frequently wound onto rotating spindles to produce packages such as a reel, tube, or cone, these being suitable packages for sale, and packages which are particularly suitable for use in subsequent operations such as those requiring the package to be unwound. In many cases these packages are required to hold specific lengths of the linear material and it is therefore necessary to have devices which make it possible to wind these specific lengths of material onto the package.

Methods of measuring thread during winding are known which depend on counting the revolutions of a pulley of known circumference over or round which the thread is drawn before it is wound onto the package being formed. In this method the force required to rotate the pulley must be provided by the thread. This increases the tension on the thread which may have undesirable effects on the thread itself or on the shape of the package being wound, these effects being most marked when winding at very high speed and when winding conical packages.

To avoid these problems of measuring length during winding it is known to wind packages to a diameter which has previously been determined to correspond approximately to the required length, but it is obvious that the actual length of material on a package wound in such a way will be affected by variations in the thickness of the material being wound and in the density of the package. Similarly it is known to wind a package with a specific number of spindle revolutions, but this will also be inaccurate because of variations in material thickness and package density and diameter.

It is an object of the invention to provide a method and apparatus for measuring the length of a linear material being wound onto a core which avoids the aforegoing disadvantages of the known measuring methods.

In accordance with one aspect of the invention, there is provided an apparatus for continuously measuring the length of linear material during winding of the material onto a rotating core to form a package, comprising first means for forming an electrical signal whose frequency is proportional to the instantaneous diameter of the package being wound, second means for forming at least one pulse of fixed length for each revolution of the package, a gating means for allowing the variable frequency signal to reach an output line only during the period of each said fixed length pulse, and a counter for algebraically counting at least a proportion of the individual cycles of said signal reaching said output line.

In accordance with a second aspect of the invention, there is provided a method of continuously measuring the length of linear material being wound onto a rotating core to form a package, comprising forming an electrical signal whose frequency is proportional to the instantaneous diameter of the package being wound, forming at least one pulse of fixed length for each revolution of the package, allowing the variable frequency signal to reach an output line only during the period of each said fixed length pulse, and algebraically counting at least a proportion of the individual cycles of said signal reaching said output line.

In accordance with a further aspect of the invention, there is provided an apparatus for continuously measuring the length of linear material being wound onto a rotating core to form a package, comprising means for continuously monitoring the diameter of the package and providing a first electrical signal dependent on the diameter of the package, means for detecting each revolution or part revolution of the package and providing a second electrical signal for each revolution or part revolution of the package, and means for combining the two electrical signals and feeding the combination into a computing device programmed to calculate the cumulative wound length of linear material from such information.

The invention is described further hereinafter, by way of example, with reference to the accompanying drawings, in which.

Figure 1:
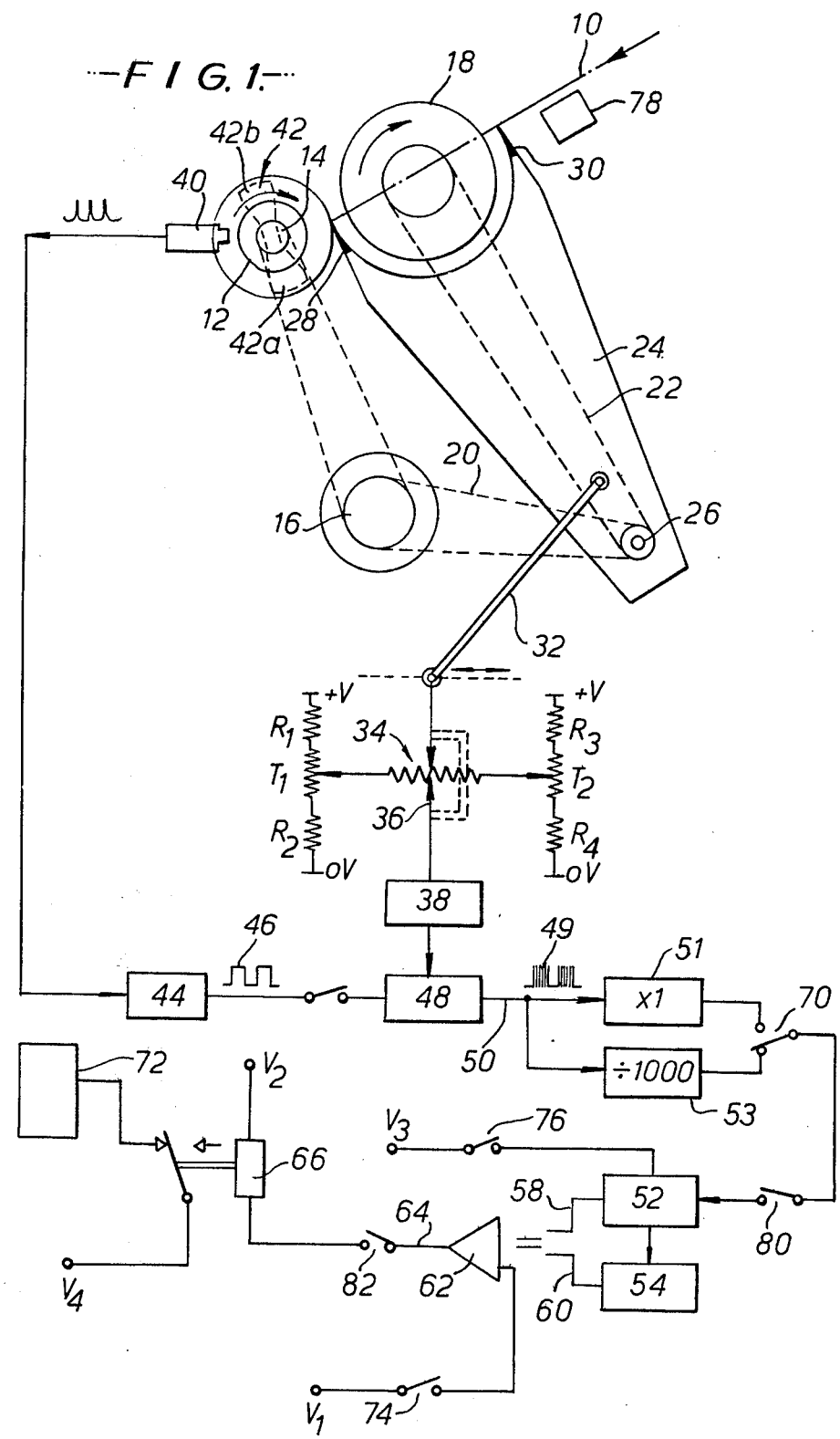
FIG. 1 is a diagrammatic illustration of one embodiment of a length measuring apparatus in accordance with the invention.

In the illustrated embodiment, thread 10 is being wound from a source (not shown) onto a core or spool 12 carried by a spindle 14 which is rotatable by a motor 16 at a constant angular velocity. The fully wound core constitutes a package which is to contain a predetermined length of thread 10 and the present apparatus is intended to provide a means of reliably achieving this predetermined wound length.

The thread 10 is directed onto the core 12 by means of a cylindrical guide drum 18 which is not illustrated in detail herein but which is described and fully illustrated in our prior British Pat. Specification No. 1,261,727 to which reference is hereby directed. As described in the latter specification, the guide drum 18 comprises a tubular member having a peripheral slot which includes a number of distinct portions, each portion being a segment of a helix. There are an even number of said portions, each helix being of the same pitch and occupying the same angular extent of the periphery of the drum 18. The helical segments are alternately left-handed and right-handed.

The arrangement is such that the thread 10 can enter the slot at one point, pass into the interior of the drum and emerge from the slot at a second point, the two points being substantially in the same plane transverse to the axis of rotation of the drum 18. As the drum 18 rotates, the points of entry and emergence of the thread 10 into and from the drum change and move in a direction along the drum axis but always lie in a plane at right angles to that axis. The effect is that the thread 10 is wound onto the core 12 in a helical manner as indicated diagrammatically in FIG. 2.

The guide drum 18, which is also rotatable by the motor 16, for example via belts 20 and 22, is carried by a support member 24 which is pivotably mounted on a spindle 26 extending in a direction parallel to the rotational axes of the guide drum 18 and the core 12. The support member 24 has a pair of thread guides 28,30, as described in British Specification No. 1,261,727, over which the thread extends during its passage to the core 12.

The thread guide 28 on the support member 24 is arranged to rest on the periphery of the package as it is being wound so that the angular position of the support member 24 changes as the diameter of the package increases. In order to enable an electrical signal to be generated which is representative of the angular position of the support member 24, and hence of the instantaneous diameter of the package being wound, the support member 24 is connected by way of an arm 32 to an electrical transducer which, in the present case, is in the form of a potentiometer 34 whose slider 36 is mechanically coupled to the arm 32. The slider 36 of the potentiometer 34 is electrically coupled to the control input of a voltage controlled oscillator 38 whose output frequency is arranged to be directly proportional to its input voltage and hence to the position of the potentiometer slider 36 and instantaneous diameter of the package being wound. The output frequency is arranged to increase with increasing diameter of the package. The oscillator 38 could alternatively be in the form of a pulse generator whose output frequency is proportional to its input voltage.

As shown in FIG. 1, the two ends of the track of the potentiometer 34 are respectively connected to a pair of trimmer potentiometers $T_1$ and $T_2$ whose tracks are connected between pairs of resistors $R_1$, $R_2$ and $R_3$, $R_4$ across a voltage supply. The potentiometer $T_1$ is provided for finely adjusting the actual potential at the low voltage end of the track of the potentiometer 34 and the potentiometer $T_2$ is provided for finely adjusting the actual potential at the high voltage end of the potentiometer. For this purpose, the resistor $R_1$ has a much higher resistance value than the resistor $R_2$ and the resistor $R_4$ has a much higher resistance value than the resistor $R_3$. Adjustment of the potentiometer $T_1$ enables the frequency of the oscillator 38 corresponding to the low diameter end of the potentiometer 34 to be finely adjusted to a desired value without substantially affecting the frequencies controlled by the upper end of this potentiometer 34. Likewise, adjustment of the potentiometer $T_2$ enables the frequency of the oscillator 38 corresponding to the high diameter end of the potentiometer 34 to be finely adjusted to a desired value without substantially affecting the frequencies controlled by the lower end of this potentiometer 34. This adjustment is effected during the setting up of the apparatus described further below.

A second transducer 40 is positioned adjacent the rotatable core 12 so as to provide an electrical output indicative of the rotations of the core. For example, the second transducer 40 can comprise a photocell adapted to receive light pulses through one or more holes in a plate carried by the core 12 as the core rotates. In the present embodiment, however, the transducer 40 is in the form of a proximity detector which magnetically detects the passage therepast of a metal member 42 carried by the core. Preferably, the metal member is substantially butterfly shaped so as to have two mechanically balanced lobes 42a,42b which each pass the detector 40 once every core revolution so that two output pulses are generated for each revolution of the core 12.

The output pulses of the second transducer are passed to a shaper circuit 44, which can be in the form of a monostable device, which is arranged to convert each pulse from the transducer 40 into a rectangular pulse 46 of fixed length. The particular length of the pulses 46 is chosen to suit the other parameters of the apparatus such as the core speed and the number of output pulses of the first transducer 40 per revolution, whereby the fixed length pulses 46 do not overlap and therefore always have a finite interval therebetween. In the present instance, the fixed length pulses 46 are chosen to be of about 1.2mS.duration.

It will be noted that the length of the pulses 46 is independent of the speed of rotation of the spindle 14 and the core 12.

The output signals from the shaper 44 and the oscillator 38 are both passed to a gate circuit 48 which is arranged to allow signals from the oscillator 38 to pass to an output line 50 only during the period of the fixed length pulses 46 from the shaper 44. The output of the gate 48 thus comprises 1.2mS. bursts or bunches of pulses 49 each time a signal arrives at the input shaper 44 from the second transducer 40, the number of individual pulses in each 1.2mS burst depending upon the frequency of the oscillator 38, and hence upon the diameter of the package, at that time.

The output of the gate 48 is connected either through a x1 circuit 51 or through a ÷1000 circuit 53 to a counter 52, in this case a five digit ring-type counter which is to be arranged to have a display which indicates directly in chosen units of length as described below. The counter 52 has means 54 for enabling a five digit setpoint to be pre-set whereby, when the countered input becomes equal to the number set on said set-point means 54, equal value electrical signals are obtained on lines 58,60 from the counter and the setpoint means 52,54, the equivalence of these signals being arranged to be detected by a comparator 62 which then provides an output signal on a line 64 to energise a relay 66 which terminates that winding operation or initiates a slowing down of the winding operation. The mechanism which achieves stoppage or slowing down of the winding mechanism is not important to the invention and has therefore not been illustrated or described in detail. In addition, as soon as the set-point has been reached, the counter 52 is arranged to automatically reset to zero. Additional control switches will be described below following an explanation of the action of the basic arrangement described above.

Figure 2:
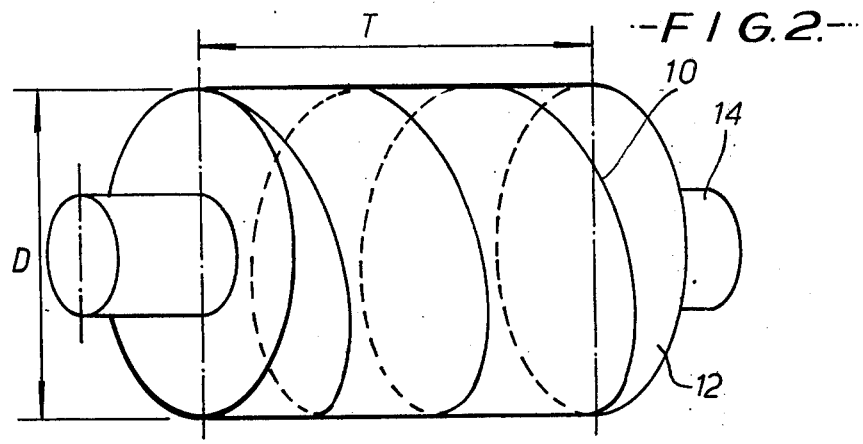
FIG. 2 is a diagrammatic illustration of a core or spool onto which a thread, whose length is to be measured, is being wound.
Figure 3:
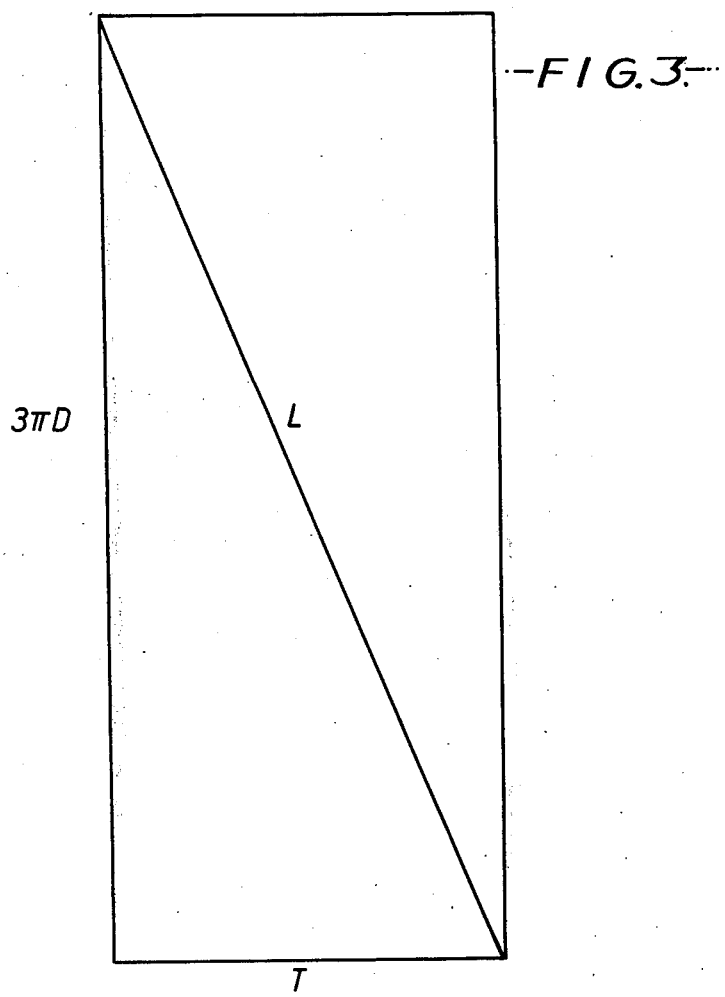
FIG. 3 is a diagram used to illustrate the basic formula from which the length wound onto the core can be calculated.

In the case of winding thread which has length but small width and thickness, it is normal practice to wind the thread onto the core in the manner of a helix as shown in FIG. 2 so as to achieve a balanced and even winding. FIGS. 2 and 3 illustrate how a generalised expression for the length wound per revolution can be derived for such an arrangement. In FIG. 2, the diameter of the core or package is assumed to be D, the length of the package assumed to be T, the number of revolutions for the thread to extend from one end of the package to the other end to be 3, and the length wound in these 3 revolutions to be L. FIG. 3 shows that the total length L wound in the 3 revolutions can be obtained by effectively opening out the cylindrical package to form a right-angled triangle having a base equal to T, a height equal to three times the circumference of the package, i.e. $3\pi D$, and a hypotenuse equal to L.

Thus, $L^2 = (3\pi D)^2 + T^2$ and $L = \sqrt{(3\pi D)^2 + T^2}$

The length l would onto the core at any particular revolution is thus given by $$l = \frac{L}{3} = \frac{1}{3} \cdot \sqrt{(3\pi D)^2 + T^2}$$

In general $$l = \frac{1}{m} \cdot \sqrt{(m\pi D)^2 + T^2}$$

where $m$ is the number of revolutions for the thread to extend from one end of the package to the other end, $D$ is the total diameter of the package at that stage, (the diameter being assumed to remain constant during that one revolution due to the small thickness of the thread) and $T$ is the length of the package.

The total length $L_n$ of thread wound onto the package during $n$ revolutions will therefore be equal to $$\frac{1}{m} \cdot \sqrt{(m\pi D_1)^2 + T^2} + \frac{1}{m}\sqrt{(m\pi D_2)^2 + T^2} + \cdots \frac{1}{m}\sqrt{(m\pi D_n)^2 + T^2}$$

$$= \frac{1}{m}\left(\sqrt{(m\pi D_1)^2 + T^2} + \sqrt{(m\pi D_2)^2 + T^2} + \cdots \sqrt{(m\pi D_n)^2 + T^2}\right)$$

where $D_n$ is the diameter of the package at the $n^{th}$ revolution.

Now in conventionally wound thread packages, the value of $m$ is usually at least 3 and the mean package diameter $D$ is of the order of half the package length $T$. Thus, the value of $(m\pi D)^2$ is relatively high compared with $T^2$, especially when the package is almost full, and $T^2$ can consequently be ignored in equation 1 to a reasonable approximation. Thus, $$L_n = \frac{1}{m}\left(\sqrt{(m\pi D_1)^2} + \sqrt{(m\pi D_2)^2} + \cdots \sqrt{(m\pi D_n)^2}\right)$$

$$= \frac{1}{m}(m\pi D_1 + m\pi D_2 + \ldots m\pi D_n)$$

$$= \pi D_1 + \pi D_2 + \ldots \pi D_n \quad \quad 11$$

As described above, in the present apparatus the output frequency of the oscillator 38 is arranged to be directly proportional to the prevailing diameter of the package, so that, in general, $$D = kF$$

where $F$ is the output frequency of the oscillator 38 at the package diameter $D$ and $k$ is a constant.

Furthermore, frequency can be defined as pulses per unit of time. The bursts or bunches of pulses emanating from the gate 48 are of fixed period. If two of these periods are considered to be the "unit of time", (there being two pulses from the detector 40 and hence two bursts of pulses from the gate 48 per revolution of the package), then the frequency corresponding to a particular package diameter can be considered to be equal to the algebraic sum of the pulses in the pair of consecutive bunches 49 which emanate from the gate 48 during one revolution of the core at that diameter.

We can thus substitute in equation 11 for $D$ whereby the total length $L_n$ for $n$ revolutions is given by $$L_n = \pi k F_1 + \pi k F_2 + \ldots \pi k F_n = K(F_1 + F_2 + \ldots F_n)$$

Since $F_1, F_2, F_3 \ldots F_n$ are respectively equal to the number of pulses in the pairs of bunches 49 triggered by each consecutive revolution of the core 12 the total length $L_n$ is proportional to the total sum of the pulses in each of the bunches emanating from the counter 48 when the core performs $n$ revolutions. It will be noted that the counter 48 is arranged to continuously perform and display this summation, although the display facility is optional.

In order to fix two points on the graph of frequency against diameter (which is taken to be a straight line) for the purpose of establishing the slope of this graph, the following procedure is adopted.

An empty core 12 of known diameter is introduced into the winding machine so that a certain frequency appears at the output of the oscillator 38. Using the above-derived expression that the length wound in one revolution is equal to $$\frac{1}{m}\sqrt{(m\pi D)^2 + T^2}$$

and substituting the true value of $D$ in the required dimensions, for example millimeters, the actual value of $m$ and the actual value of $T$, the actual length wound in one revolution at that diameter can be calculated. With the x1 circuit selected by a switch 70, the core 12 is then rotated through one revolution so that two bursts of pulses 49 leave the gate 48 and enter the counter 52. The counter display is observed. The trimmer potentiometer $T_1$ is then adjusted to correspondingly adjust the oscillator frequency in a direction to raise or lower the indicated counter output as necessary to make the counter output coincide numerically with the calculated length for one revolution. The core is then rotated again through one revolution and the corresponding counter output observed. The aforegoing procedure is repeated manually a number of times until the counted pulses for one revolution are numerically equal to the calculated true length. This sets a point on the lower end of the graph of frequency against diameter.

A point on the upper end of the graph is then set by repeating the aforegoing procedure but with a fully wound package, or core of diameter equal to that of a fully wound package, inserted in the machine. Under these circumstances, the slider 36 is at the upper end of its track and the trimmer potentiometer $T_2$ is adjusted to give a counter output for one revolution of the core equal to the calculated length $$\frac{1}{m} \cdot \sqrt{(m\pi D_f)^2 + T^2}.$$

where $D_f$ is equal to the diameter of the fully wound package. It has been found that, using a voltage controlled oscillator whose output frequency is proportional to input voltage, the characteristic can be sufficiently close to a straight line between these two set points for the length of a revolution at an intermediate diameter to be satisfactorily accurately obtained from a corresponding intermediate point on the graph.

During a normal length measuring operation, the switch 70 is arranged to connect the output of the gate 48 to the counter via the ÷1000 circuit 53 in order to give a counter reading directly in meters. Of course, the counter need not read in metric units but can be any other desired units depending upon the units chosen for the original length calculation during the setting up procedure.

Thus, with the illustrated apparatus set up in the aforegoing manner, the cumulative total length of the thread 10 would onto the core 12 is continuously equal to the displayed output of the counter 52.

In operation of the apparatus, a desired length to be wound onto successive cores 12 is set on the set point means 54. The machine mechanism automatically inserts an empty core 12 into the apparatus by means not shown and winding commences. When the counter output becomes equal to the value set in the set point means 54, equal signals appear on the lines 58 and 60 and the comparator 62 is actuated to energise the relay 66. Energisation of the relay 66 is arranged to stop or initiate slowing down of the machine, indicated diagrammatically by the box 72 and hence initiate termination of the winding operation. A changer mechanism then removes the fully wound package and inserts a new empty core. The machine is then reactivated to repeat the winding sequence.

In practice, the winding machine has a certain amount of inertia so that a number of meters are wound during the slowing down period when the machine has been de-energised. In order to eliminate the error due to the extra amount wound during the slowing down period on all cores but the first, the counter 52 is arranged to be automatically reset to zero when the setpoint has been reached, whereby during slowing down the counter starts to count once again from zero. When a subsequent core is inserted, the counter 52 starts to count not from zero but from the value reached during the slowing down period of the previous core so that much less thread is wound onto the new core.

When the machine restarts to perform a new winding operation, a switch 74 is arranged to be closed to apply a reset signal to the comparator 62 to release the relay 66. A manual reset switch 76 enables the counter to be manually reset to zero at any time.

In accordance with conventional practice, a thread break detector 78 is provided adjacent the thread in its passage to the guide drum 18. The detector 78 has associated switches 80 and 82 adapted to prevent further pulses reaching the counter 52 and to shut down the machine altogether should the thread break upstream of the package being wound.

In the event that a conical or frusto-conical package is being wound, it has been found that the wound length can be satisfactorily accurately obtained by considering it to be equivalent to a cylindrical package of diameter equal to the mean diameter of the conical or frusto-conical package. The setting up procedure then follows that for such an equivalent cylindrical package.

The aforegoing length measuring technique can also be used in the relatively more simple situation in which an elongate web of material having length and width but negligible thickness is being wound onto a cylindrical core. The length of material wound onto the core at any particular revolution of the core is equal to $\pi D$ where $D$ is equal to the total diameter of the package at that time, the diamter again being assumed to remain constant during that one revolution due to the small thickness of the material. The total length $L_n$ of material wound onto the package during $n$ revolutions will therefore be equal to $$\pi d_1 + \pi d_2 + \pi d_3 + \pi d_4 \ldots + \pi d_n \ldots \text{ equation 111}$$

where $d_n$ is the diameter of the package at the $n^{th}$ revolution.

As before, we can substitute in equation 111 for $d$ whereby the total length $L_n$ for $n$ revolutions is given by $$L_n = \pi k f_1 + \pi k f_2 + \pi k f_3 + \pi k f_4 \ldots + \pi k f_n = \pi k (f_1 + f_2 + f_3 + f_4 \ldots + f_n)$$

$$L_n = K (f_1 + f_2 + f_3 + f_4 \ldots + f_n)$$

As before, since $f_1, f_2, f_3 \ldots f_n$ are respectively equal to the number of pulses in the pairs of bunches 49 triggered by each consecutive revolution of the core, the total length $L_n$ is proportional to the total sum of the pulses in each of the bunches emanating from the gate 48, the counter 52 continuously performing this summation.

I claim:
1. An apparatus for continuously measuring the length of linear material during winding of the material onto a rotating core to form a package, said apparatus comprising:
    a member mounted for movement with increasing package diameter of said package as it is being wound,
    means coupled to said member for forming a continuous electrical signal having its frequency at all times proportional to the instantaneous diameter of the package being wound and independent of the speed of winding,
    means mounted adjacent said core for detecting rotation of said core,
    means connected to said detecting means for forming at least one pulse of fixed length for each revolution of the package to form a pulse train having a frequency independent of package diameter,
    an output line,
    a gating means operatively connected with said first and second means and with said output line for receiving the fixed length pulses and the variable frequency signal and permitting the latter signal to reach the output line only during the period of each said fixed length pulse, and
    a counter coupled to the output line for algebraically counting at least a proportion of the individual cycles of said variable frequency signal reaching said output line.

2. An apparatus according to claim 1 wherein said continuous signal producing means includes:
    a first transducer mechanically coupled to said pivotable member, and
    a variable frequency oscillator coupled to and controlled by the first transducer for providing said variable frequency electrical signal.

3. An apparatus according to claim 2 in which said variable frequency oscillator is voltage controlled and has a straight line output characteristic between input voltage magnitude and output frequency.

4. An apparatus according to claim 3 in which said first transducer is a first potentiometer having a movable contact coupled to said pivotable member and having two end contacts between which said movable contact is operable.

5. An apparatus according to claim 4, further comprising a pair of trimmer potentiometers connected to the two end contacts of the first potentiometer and which enable the voltages at the end contacts of the first potentiometer to be finely adjusted.

6. An apparatus according to claim 2 for winding thread or yarn onto a core, in which the pivotable member comprises a support for a cylindrical guide drum adapted to guide the thread or yarn onto the core, the pivotable member resting on the periphery of the package being wound so that its angular position is varied as the package diameter changes.

7. An apparatus according to claim 1 wherein said detecting means comprises:
 a second transducer disposed to detect each revolution or part revolution of the core and to generate electrical revolution detection signals representative of each such detection, and pulse forming means comprises
 pulse shaping means connected to receive said revolution detection signals and to produce rectangular electrical pulses of constant length in response thereto, which rectangular electrical pulses constitute said fixed length pulses.

8. An apparatus according to claim 7 including said rotating core and further comprising at least one metallic lobe fixed to the core so as to rotate with same, the second transducer being a proximity detector which detects the passage therepast of said lobe.

9. An apparatus according to claim 8 in which there are two said lobes fixed to the core so that two signals are produced by the second transducer, and hence two fixed length pulses are formed, for each revolution of the core.

10. An apparatus according to claim 7, wherein said pulse shaping means comprises a monostable circuit which converts the signals from the second transducer into said fixed length pulses.

11. An apparatus according to claim 1, further comprising a times one circuit and a divide by thousand circuit, and means for selectably connecting the said output line from said gating means to the counter either by way of said times one circuit or said divide by thousand circuit.

12. An apparatus according to claim 1, in which the counter is arranged to continuously display the cumulative total of the cycles counted by the counter.

13. An apparatus according to claim 12, in which the counter includes means for pre-setting a value to which the counter is to count, the counter being arranged to supply a control signal for initiating termination of winding when the count becomes equal to the pre-set value.

14. An apparatus according to claim 13 in which the counter is arranged to be automatically reset to zero when the count becomes equal to the pre-set value, any turns of the core which occur during the slowing down period starting a new count.

15. An apparatus according claim 14 in which the next winding operation with a subsequent core is commenced with the count at its value reached during the slowing down period of the previous core after the counter had been set to zero.

16. An apparatus according to claim 12 further comprising a material break detector located adjacent the path of material to the core and adapted to provide a signal upon a break in the material occurring which is arranged to prevent further pulses from reaching the counter.

17. A method of continuously measuring the length of linear material being wound onto a rotating core to form a package, comprising:
 forming a continuous electrical signal whose frequency is proportional at all times to the position of a member mounted for movement with increasing package diameter and thus to the instantaneous diameter of the package being wound, and independent of the speed of revolution of said core,
 detecting rotation of said core,
 forming a pulse train with at least one pulse of fixed length for each revolution of the package, and having a frequency independent of package diameter,
 passing the variable frequency signal to an output line only during the period of each said fixed length pulse, and
 algebraically counting at least a predetermined proportion of the individual cycles of said variable frequency signal reaching said output line.

* * * * *